(12) United States Patent
Dekker (10) Patent No.: US 8,897,108 B1
(45) Date of Patent: Nov. 25, 2014

(54) SINGLE BEAM RADIAL TRACKING METHOD FOR OPTICAL DISCS

(71) Applicant: Marvell International Ltd., Hamilton (BM)

(72) Inventor: Antonius Leonardus Johannes Dekker, Eindhoven (NL)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/871,723

(22) Filed: Apr. 26, 2013

Related U.S. Application Data (60) Provisional application No. 61/644,267, filed on May 8, 2012, provisional application No. 61/638,678, filed on Apr. 26, 2012.

(51) Int. Cl.
*G11B 7/00* (2006.01)
*G11B 7/09* (2006.01)

(52) U.S. Cl.
CPC .................................. *G11B 7/0901* (2013.01)
USPC ....................................................... 369/44.35

(58) Field of Classification Search
None
See application file for complete search history.

(56) References Cited

U.S. PATENT DOCUMENTS

| | | | | | |
|---|---|---|---|---|---|
| 4,365,324 | A | * | 12/1982 | Michaelis | 369/44.32 |
| 4,748,609 | A | * | 5/1988 | Yonezawa et al. | 369/44.13 |
| 4,775,966 | A | * | 10/1988 | Miura et al. | 369/44.32 |
| 4,787,076 | A | * | 11/1988 | Deguchi et al. | 369/44.34 |
| 4,855,991 | A | * | 8/1989 | Kaku et al. | 369/275.4 |
| 6,434,096 | B1 | * | 8/2002 | Akagi et al. | 369/44.32 |
| 6,498,772 | B1 | * | 12/2002 | Fujiune et al. | 369/44.29 |
| 7,079,461 | B2 | * | 7/2006 | Cho et al. | 369/53.14 |
| 7,145,849 | B2 | * | 12/2006 | Chang et al. | 369/44.41 |
| 7,164,630 | B2 | * | 1/2007 | Nakane et al. | 369/44.32 |
| 7,317,669 | B2 | * | 1/2008 | Lee | 369/44.29 |
| 7,746,734 | B2 | * | 6/2010 | Umeda et al. | 369/44.28 |
| 2002/0031061 | A1 | * | 3/2002 | Yonezawa et al. | 369/44.32 |
| 2006/0077801 | A1 | * | 4/2006 | Tseng et al. | 369/44.27 |
| 2007/0002703 | A1 | * | 1/2007 | Yonezawa et al. | 369/44.29 |

* cited by examiner

*Primary Examiner* — Brenda Bernardi (57) ABSTRACT

An apparatus and a method for reducing an offset error in a position of an objective lens of an optical disk reader by using a single beam push-pull signal. The apparatus includes a radial actuator that is configured to control the position of the objective lens. A controller that receives a push-pull signal that corresponds to the offset error of the objective lens and estimates the offset based on the push-pull signal. A sine generator generates a sine wave based on the estimated offset and further generates a feedback signal based on the sine wave to drive the radial actuator to reduce the offset error in the position of the objective lens. The apparatus also includes a data detector that is utilized to change the tracking method of the optical disk reader to a differential phase detection method upon detecting data in a data spire of the optical disk.

16 Claims, 8 Drawing Sheets

SINGLE BEAM RADIAL TRACKING METHOD FOR OPTICAL DISCS

INCORPORATION BY REFERENCE

This present disclosure claims the benefit of U.S. Provisional Application No. 61/638,678, filed on Apr. 26, 2012, and U.S. Provisional Application No. 61/644,267, filed May 8, 2012, which are incorporated herein by reference in their entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Typically, optical disk readers can include an objective lens that tracks a data spire of the optical disk. However, due to optical axis misalignment, a laser spot may not focus correctly on the data spire and may result in erroneous detection. Several methods, such as differential push pull (three-beam method) and differential phase detection methods exist to correct the error in the position of the objective lens.

SUMMARY

An optical disk like CD, DVD, DVD-RAM or Blu-ray disk include a transparent substrate of data layers. These data layers have a data stream in the form of a data spire (i.e., a data track) with a track width according to their corresponding disk standards. The data spire needs to be tracked by a laser spot that is focused on the disk by an objective lens.

The laser spot is reflected from the data layer and an optical pickup unit (OPU) is constructed in such a way that it projects the reflected beam on a photo-detector. However, due to continuous movement of an objective lens of the OPU, a central axis of the objective lens holder may not always align exactly with a sledge center axis, thereby giving rise to radial error in tracking the objective lens.

Aspects of the present disclosure can provide a method and an apparatus that implement a single beam radial error tracking method for reading optical disks. The single beam method is more efficient than other methods, as it does not require high precision adjustment laser to focus multiple beams on the data spire, and moreover can track over non-written areas of the disk.

The disclosure can provide an apparatus for reducing an offset error in a position of an objective lens of an optical disk reader. The apparatus can include a radial actuator that is configured to control the position of the objective lens and a controller that is configured to receive a push-pull signal that corresponds to the offset error of the objective lens. Upon receiving the push-pull signal, the controller can estimate an offset of the objective lens based on the push-pull signal and generates a sine wave based on the estimated offset. The sine wave has an amplitude that can be generally equal in magnitude to the estimated offset and a phase that is proportional to a rotational speed of the disk. The controller drives the radial actuator based on the sine wave to reduce the offset error in the position of the objective lens.

Further, the controller can be configured to operate in two modes. Specifically, the controller is configured to operate in a first mode when the rotational speed of the disk is low and a second mode when the rotational speed of the disk is high.

In the first mode, a first portion of the controller that includes a compensator, having a lead-lag filter and an integrator receives the push-pull signal and calibrates an offset ratio based on a radial actuator drive signal and an offset error in the position of the objective lens. The first portion further includes a first sine generator that is configured to generate a disk angle signal and provide the disk angle signal to a synchronous detector that is configured to detect an offset signal.

According to another aspect of the disclosure, the controller can be configured to operate in a second mode, wherein a second portion of the controller that includes a second sine generator, generates a sine wave based on an estimated offset. The sine wave has an amplitude that is generally equal in magnitude to the estimated offset and phase that is proportional to the rotational speed of the disk. The controller can also be equipped with a switch that is configured to activate the second sine generator and deactivate the synchronous detector while operating in the second mode.

The apparatus which implements the single beam radial tracking can also include a photo-detector that is configured to generate a data signal, a push-pull signal, and a differential phase detection signal based on an optical signal received from the optical disk. The controller of the apparatus is equipped with a data detector that is configured to detect information on a data track of the optical disk and to change a data tracking mechanism from a push-pull mechanism to a differential phase detection (DPD) mechanism upon detecting information in the data track of the disk.

Furthermore, an aspect of the disclosure may also present a method for reducing an offset error in a position of an objective lens of an optical disk reader. The method can include: receiving a push-pull signal that corresponds to the offset error of the objective lens and estimating an offset of the objective lens based on the push-pull signal. Next, the method generates a sine wave based on the estimated offset of the objective lens, the sine wave having an amplitude that is generally equal in magnitude to the estimated offset and a phase that is proportional to a rotational speed of the optical disk, and drives a radial actuator based on the generated sine wave to adjust the position of the objective lens.

In addition, the method can further include determining whether the controller should operate in a first mode or a second mode, based on the rotational speed of the optical disk. Accordingly, if the method operates in the first mode, the controller is further configured to calibrate an offset ratio based on a radial actuator drive signal and an offset error in the position of an objective lens. Also, the method generates a disk angle signal based on a rotating speed of an optical disk, and provides the disk angle signal to a synchronous detector, thereby enabling it to detect an offset signal.

Alternatively, if the method operates in the second mode, it generates a sine wave based on an estimated offset. The sine wave has an amplitude that is generally equal in magnitude to the estimated offset and phase that is proportional to the rotational speed of the disk. Further, the method may also include, detecting information on a data track of the optical disk and accordingly changing a data tracking mechanism from a push-pull mechanism to a differential phase detection (DPD) mechanism based on the detection of information on the data track.

Furthermore, aspects of the disclosure can provide an optical reading system having an optical pick up unit (OPU) for reducing an offset error in a position of an objective lens of the optical reading system. The OPU may include a radial actuator that is configured to control the position of the objective lens and a controller that is configured to receive a push-pull signal that corresponds to the offset error of the objective lens. Upon receiving the push-pull signal, the controller estimates an offset of the objective lens based on the push-pull signal, and generates a sine wave based on the estimated offset. The sine wave can have an amplitude that is generally equal in magnitude to the estimated offset and a phase that is proportional to a rotational speed of the disk. The controller drives the radial actuator based on the sine wave to reduce the offset error in the position of the objective lens.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
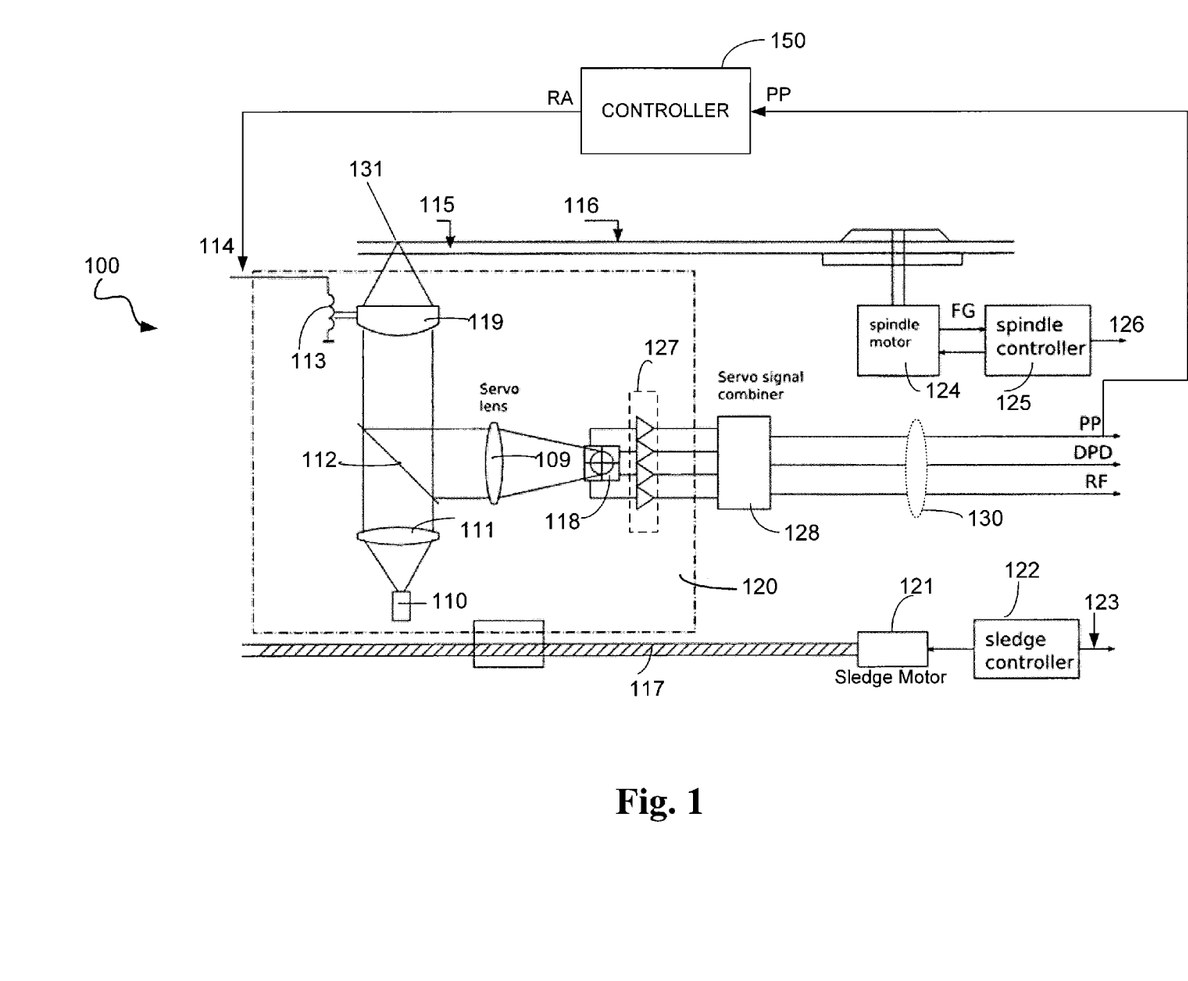
FIG. 1 shows a block diagram of an exemplary single beam radial tracking device.

FIG. 1 shows an exemplary optical system 100 for controlling a position of a beam spot 131 on an optical disk 116. The optical system 100 can include a spindle motor 124. The spindle motor 124 can be coupled to and driven by a spindle controller 125, that can drive the optical disk 116 to rotate about an axis.

As shown, the optical system 100 can also include a sledge motor 121, coupled to a sledge controller 122, that drives a sledge 117, for example by rotating a transport screw. The sledge 117 supports an optical pick-up unit 120 and positions the optical pick-up unit 120 at a specific position on the optical disk 116.

The optical pick-up unit 120 includes a laser 110, that emits a beam which passes through a collimator lens 111. The collimator lens 111, forms collimated light beam that passes through a beam splitter 112 and an objective lens 119. The objective lens 119 focuses the collimated beam onto an information layer 115 of the optical disk 116. The emitted beam from the laser 110 thus forms a beam spot 131 on the optical disk. The position of the beam spot 131 can vary corresponding to a movement of the sledge 117.

The optical pick-up unit 120 also includes a radial actuator 113 that is driven by an actuator control signal 114 that can move the objective lens 119 in a radial direction. The radial actuator 113 is coupled to the objective lens 119 and can adjust the position of the objective lens 119 in response to a radial actuator signal (RA) that is received from a controller 150.

The optical pick-up unit 120 can detect a reflected beam which is deflected by a beam splitter 112, through a servo lens 109, and onto a photo-detector 118. The photo-detector 118, is configured to generate data and error signals 130, based on the detected beam intensity. The optical pick-up unit 120 can include an array of amplifiers 127, that amplify the generated data and error signals. As shown, a servo signal combiner 128 can generate radio frequency (RF), push-pull (PP) and differential phase detection (DPD) signals based on the signals from the amplifier 127.

Further, the optical system 100 can include a controller 150 that takes as input, a push-pull (PP) signal generated by the servo signal combiner 128 of the optical pick-up unit 120, and generates the radial actuator control signal 114 that drives the radial actuator 113. Accordingly, the controller 150 can be configured to reduce an error in the position of the objective lens 119. The controller 150 can further be configured to calibrate an offset ratio that is based on the radial actuator control signal RA and a corresponding movement in the objective lens 119. In order to calibrate the push-pull offset ratio, the controller 150 can instruct the radial actuator 113 to move the objective lens 119 by a pre-determined control signal and measure the bias as a function of the objective lens movement.

During operation, distortions caused by continual movement of the objective lens 119 can cause a center axis of the objective lens to not align exactly with the sledge (transport screw) 117 center axis. A distance between the objective len's center axis and the transport screw center axis is referred to as central error. As a result of central error, the beam spot 131 which is formed by an emitted beam passing through the objective lens 119 can shift radically away from the sledge's center axis.

The beam spot 131 may not exactly overlap with a target data track center. A distance between the beam spot's center and the target data track center is referred to as radial error. The radial error indicates a status of the beam spot's relationship with a nearby track and space (area between tracks). Track and space can be configured to have different reflectivity. Consequently, an intensity characteristic of a reflected beam can depend on the beam spot relationship with a nearby track and space. For example, a track can be configured to have less reflectivity, while a space can be configured to have a higher reflectivity. Therefore, a beam reflected by the track can have lower beam intensity, whereas a beam reflected by the space can have a higher beam intensity.

Large radial errors tend to degrade the performance of the optical system 100. In order to reduce the offset caused by the radial error, the controller 150 acting as a feedback system, can determine the status of the optical system 100 based on the detection of reflected beams which are detected by the quadrants of the photo-detector array. The reflected beam can form a reflected beam spot on the quadrant detector array so that each detector of the quadrant detector array can detect a portion of the reflected beam spot.

To reduce the offset error caused by the radial movement of the objective lens 119, the optical pick-up unit 120, detects the reflected beam from the optical disk 116 and focuses the reflected beam on the photo-detector 118. Based on the intensity of the reflected beam that is impinged on the quadrants of the photo-detector 118, the photo-detector 118 generates a corresponding data signal, a push-pull signal (PP) and a differential phase detection signal (DPD). The push pull signal corresponds to the magnitude of radial error. In order to reduce the radial error and control the position of the objective lens 119, the push-pull signal can be fed back to the controller 150 to generate the radial actuator control signal 114. The radial actuator (RA) control signal 114, drives the radial actuator 113, which controls the movement of the objective lens 119.

Figure 2:
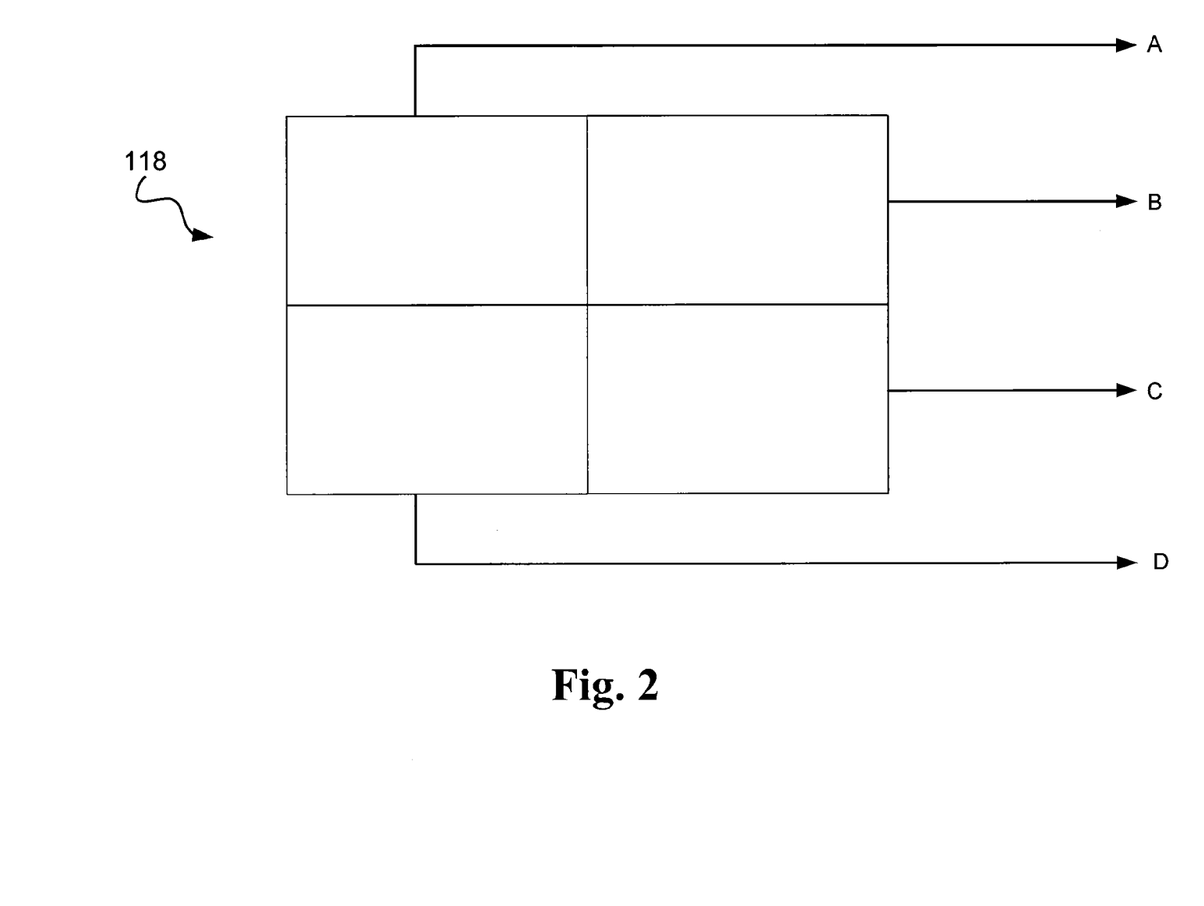
FIG. 2 shows a block diagram of an exemplary non-limiting example of a quadrant photo-detector.

FIG. 2 shows an exemplary scenario of a quadrant photo-detector array 118. The photo-detector array includes four detectors labeled A, B, C, and D. Each of the detectors can detect a portion of the reflected beam spot that falls in its detection scope. A left portion of the quadrant detector array can include detectors A and D and right portion of the quadrant detector array can include detectors B and C.

The quadrant photo-detector array 118 can transmit signals corresponding to the beam intensity detected by each detector to the controller 150. As shown in FIG. 1, a servo signal combiner 128 can be used to obtain a push-pull (PP) signal, a differential phase detection (DPD) signal, and a data signal (RF) from the signals obtained from the four quadrants of the photo-detector 118. The controller 150 processes the PP signal and drives a radial actuator signal RA to control the radial movement of the radial actuator 113. The PP signal can be defined as follows: $PP=(I_a+I_d)-(I_b+I_c)$, where $I_a$ is the transmitted signal corresponding to beam intensity detected by detector A, $I_b$ is the transmitted signal corresponding to beam intensity detected by detector B, $I_c$ is the transmitted signal corresponding to beam intensity detected by detector C, and $I_d$ is the transmitted signal corresponding to beam intensity detected by detector D.

The DPD signal can be obtained as follows: $DPD=(P(I_a+I_c)-P(I_b+I_d))$, where $P(I_a+I_c)$ and $P(I_b+I_d)$ are the pulse trains and P is the phase. Further, note that the RF signal (the data signal) is obtained as follows: $RF=I_a+I_b+I_c+I_d$.

Figure 3:
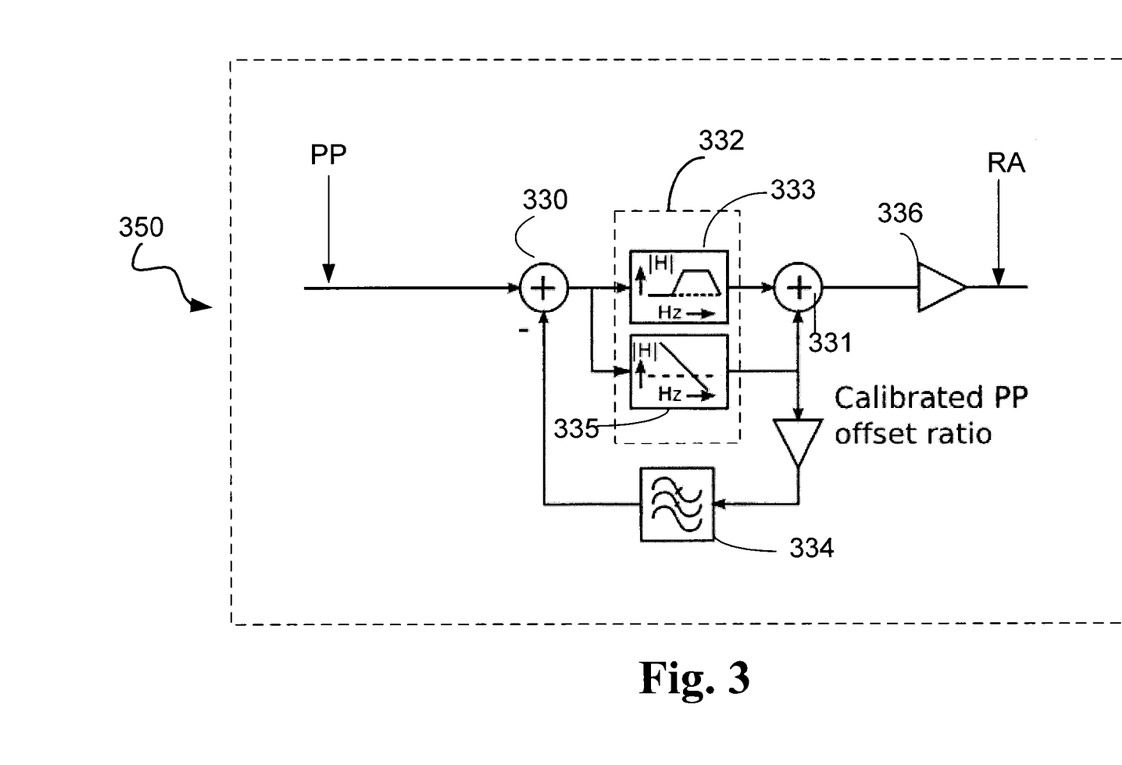
FIG. 3 depicts a block diagram of an exemplary radial controller.

FIG. 3 depicts a block diagram of an exemplary controller 350 according to an aspect of the disclosure. Depending on the optical pickup unit (OPU), the differential push-pull tracking solution may not always be reliable for multilayered disks. The data layers in such disks are semi-transparent and incur a reflection of the main beam from one data layer, interfering with a side beam of another data layer. Hence, to improve accuracy a default tracking method of the differential phase detection (DPD) can be employed. However, if the optical disk includes blank areas, the DPD solution is not feasible. Therefore, in order to jump over non-written areas (i.e., track over data interruptions), the disclosure describes a single beam push-pull method that implements an offset cancellation to account for the radial error.

As shown in FIG. 3, the push-pull (PP) signal is input into a compensator unit 332 of the controller 150. High frequency and low frequency components of the push-pull signal are respectively passed through a lead-lag filter 333 and an integrator 335, that are included in the compensator 332. The compensator 332 can ensure the stability of the feedback loop by reducing the phase lag of the radial actuator signal (RA) that drives a radial actuator. The compensator 332 can also ensure a sufficient low frequency gain to control the radial actuator signal (RA). Further, a calibrated push-pull offset ratio is obtained from the low frequency components of the radial actualtor control signal (RA), which is further passed through a low pass filter 334 to filter out the high frequency components. Alternatively, the calibrated push-pull offset ratio can be obtained by summing (via summer 331), the high frequency components and low frequency components of the RA. The calibrated push-pull signal is sent back via a summer 330 to the input push-pull signal to correct for radial errors. An amplifier 336 can be used to generate the radial actuator control signal (RA) which drives the radial actuator 114.

The radial actuator control signal RA can be directly proportional to a movement of the objective lens 119. Specifically, as the mean value of the movement in objective lens 119 goes higher, a proportional increase is observed in the actuator control signal RA. However, as the spinning speeds of the disk (disk rotational speeds) approach the resonance frequency of the actuator, such a method to reduce the bias may become less accurate due to harmonic distortions of the actuator control signals. Further, the proportionality between the actuator control signal RA to the objective lens 119 deviation is no longer valid at high rotational speeds of the disks.

Figure 4:
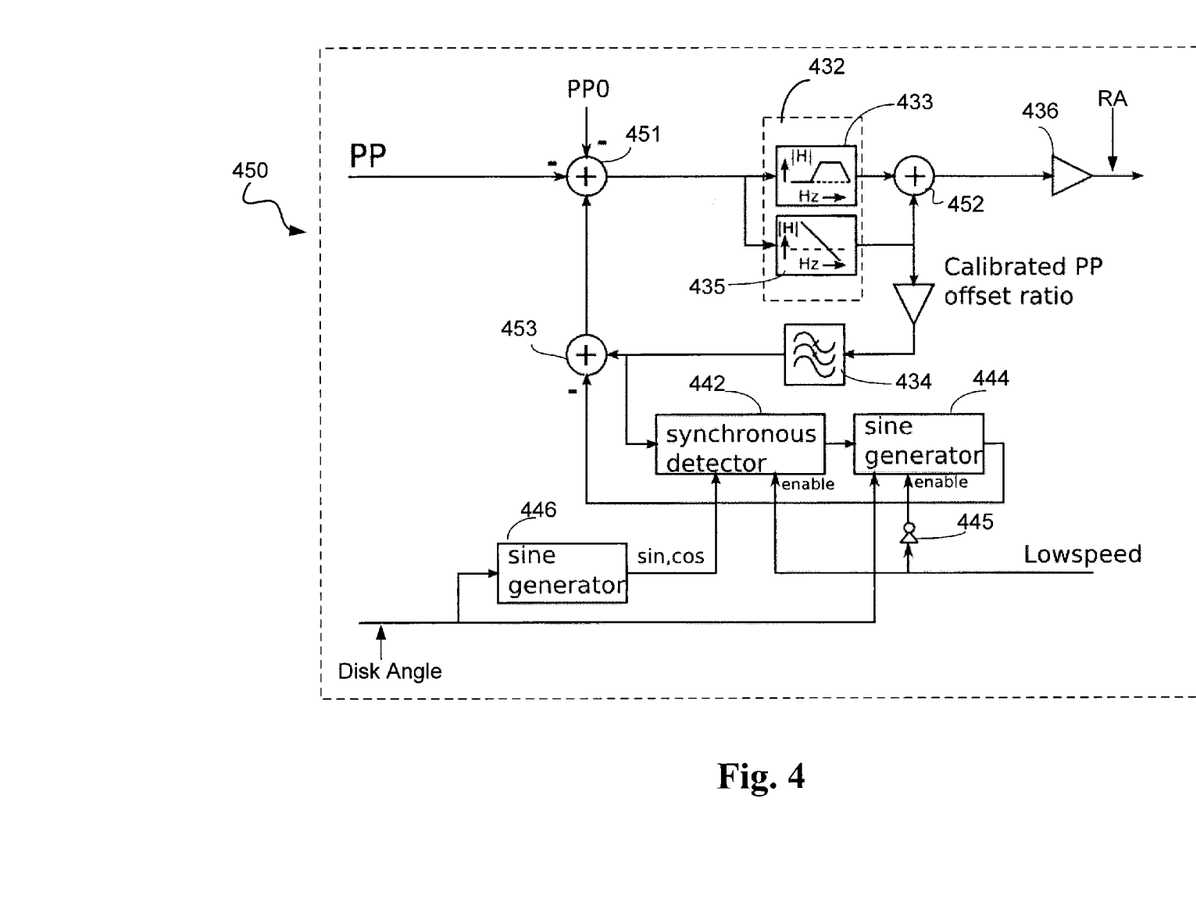
FIG. 4 depicts a block diagram of an exemplary radial controller according to one embodiment of the present disclosure.

To improve accuracy, FIG. 4 depicts an exemplary radial controller 450 according to an embodiment of the disclosure. The radial controller 450 can include a compensator unit 432 which includes a lead-lag filter 433, an integrator 435, and a low pass filter 434. Because the calibration of the push-pull offset ratio, the operation of units (432, 433, 435), and the summers (451, 452) is similar to that described above with respect to FIG. 3, a description of these components is omitted here.

The controller 450 in FIG. 4 further includes a synchronous detector 442, a first sine generator 446, and a second sine generator 444. Also included in the controller 450 is a switch 445 (such as an invertor switch or the like) which enables the device to select either the synchronous detector 442 or the sine generator 444 based on the rotational speed of the disk. Accordingly, the controller 450 has two modes of operation: a first mode of operation at low rotational speeds of the optical disk; and a second mode of operation at high rotational speeds of the optical disk.

In the first mode of operation, the synchronous detector 442 is used to detect the offset signal (corresponding to the offset error) of the push-pull signal. For its operation, the synchronous detector 442 requires a sine wave signal representing the frequency of the rotating optical disk. Hence, a disk angle signal is generated from the spindle controller 125 (as shown in FIG. 1). The sine generator 446 generates the sine and cosine parameters of the disk angle and provides them as an input to the synchronous detector 442. In the first mode of operation of the controller 450, the synchronous detector 442 is enabled by switch 445 and takes as input the sine and cosine parameters from the sine generator 446 to detect the offset signal. The sine generator 444 is deactivated by the switch 445. The controller 450 in the first mode of operation performs a Fourier analysis of the detected offset signal by using as co-efficients (of the Fourier Transform), the sine and cosine parameters of the disk angle.

In the second mode of operation, the controller 450, enables the sine generator 444 and disables the synchronous detector 442 with the switch 445. The sine generator 446 is also disabled in the second mode of operation. The sine generator 444 generates a signal that corresponds to the offset of the push pull signal. The amplitude and phase of this generated signal are determined at low speeds using the synchronous detection of the offset signal that is estimated by the actuator control feedback. The generated signal that corresponds to the offset is added via summer 453.

Accordingly, the controller 450 as shown in FIG. 4, is capable to correct offset errors at high rotational speeds of the disk when there is harmonic distortion between the actuator control signal and the movement of the objective lens 119. The tracking method used by the controller 450 of FIG. 4 is a single beam push-pull method.

Figure 5:
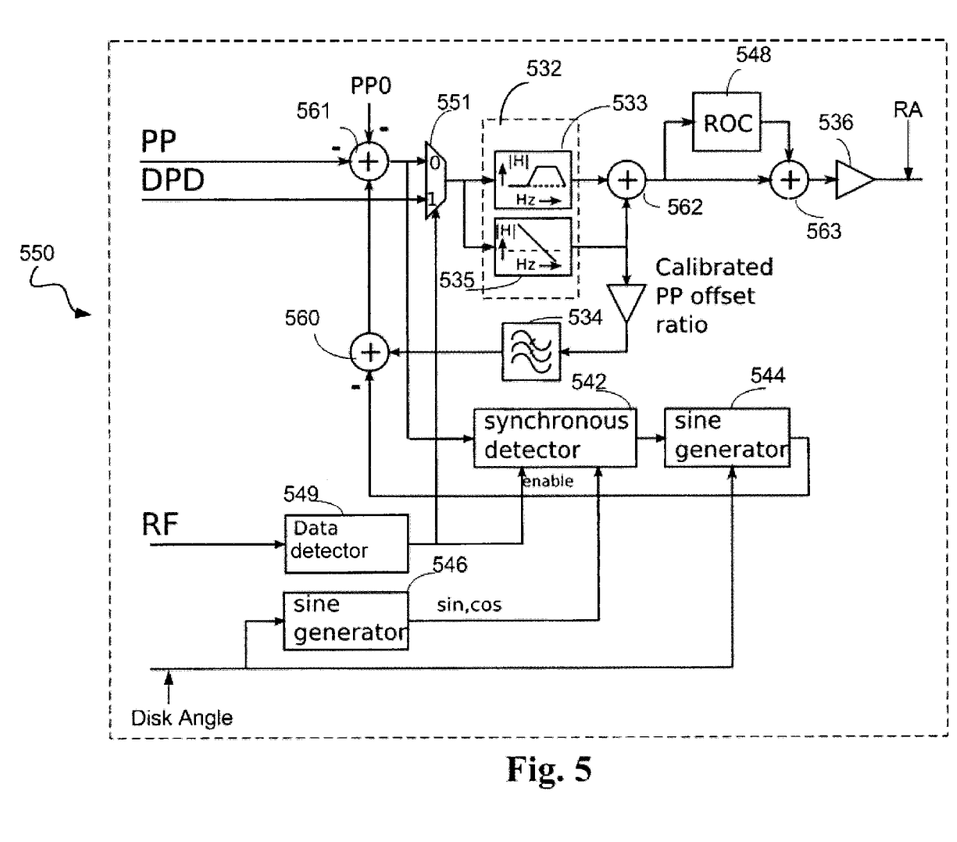
FIG. 5 shows a block diagram of an exemplary controller according to another embodiment of the present disclosure.

FIG. 5 shows a block diagram of an exemplary controller 550, according to another embodiment of the disclosure. In this embodiment, the tracking method in the optical system 100, is changed from the single beam push-pull method to a differential phase detection (DPD) method.

The controller 550 includes a compensator 532 that includes a lead-lag filter 533 and an integrator 535, a synchronous detector 542, a first sine generator 546, and a second sine generator 544. Again, the operation of these units along with the summers (560, 561 and 562) is similar to that described with respect to FIGS. 3 and 4, respectively, and thus further description is omitted here.

As shown in FIG. 5, the controller 550 receives an RF signal (data signal) detected by the photo-detector 118 as input to a data detector 549. The data detector 549 detects information on a data track of the optical disk and outputs a signal to a switch comparator 551. As depicted in FIG. 5, whenever data is detected on a data track, the data detector 549 activates the switch comparator 551, and changes the input signal to the compensator unit 532 from the push-pull signal to the DPD signal. On the other hand, when there is no data on a data track in the CD (non-written area), the push-pull signal continues to be the input to the compensator 532 and the controller 550 operates in a manner similar to that as described with respect to FIG. 4.

As shown in FIG. 5, when data is tracked by the DPD signal the offset signal can be detected by the synchronous detector 542 from the PP signal. Alternatively, the offset can also be detected from the calibrated push-pull offset ratio determined from the radial actuator control signal RA.

Accordingly, in this embodiment the offset is updated in a written area of the data track of the optical disk by switching the tracking method to a differential phase detection (DPD) method. Further, depending on the amount of disk eccentricity and the amount of low frequency gain of the compensator there may be a small dynamic offset which is a function of the disk angle and is not related to the objective lens position. In order to reduce this offset, a run-out compensator (ROC) 548, can be optionally implemented before amplifying the signal through the amplifier 536 to be sent to the radial actuator 113 by using the summer 563.

The controller described in the above embodiments can include a frequency compensator (equalizer). The compensator includes a lead-lag filter and an integrator. The compensator is configured to guarantee stability of the feedback loop, and increase the feedback gain of the low frequencies of the push-pull signal. The controller of FIG. 5 includes an RF detector which is configured to detect data on a data spire and accordingly activate the comparator switch 551 to change the tracking method from the push-pull method to the differential phase detection method. Note that as shown in FIG. 5 the input to the compensator was either the push-pull signal or the DPD signal, depending on if data was detected by the data detector 549.

However, in some situations there is a delay in switching from a data block to a non-written area and vice-versa of the optical disk. The delay occurs due scratches on the disk, disk wobbling, or the like. In such scenarios, the data detector may not accurately detect the presence of data on the data track and hence result in no DPD signal being acquired.

Figure 6:
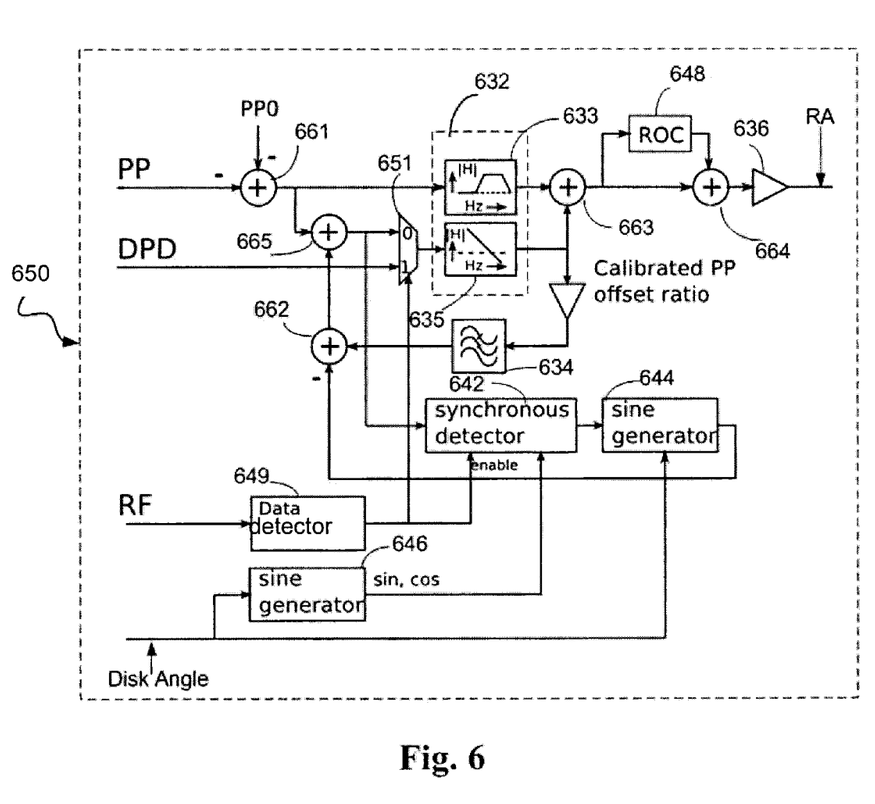
FIG. 6 shows a block diagram of an exemplary controller according to a another embodiment of the present disclosure.

In order to overcome the incorrect data detection by the data detector, FIG. 6 shows an exemplary controller 650, according to another embodiment of the disclosure. The controller 650 includes a compensator 632, a synchronous detector 642, a first sine generator 646, a second sine generator 644, and a data detector 649. Again, the operation of these units along with the summers (661, 662 and 663) is similar to that described with respect to FIGS. 4 and 5, respectively, and thus a description of the operation of these units is omitted here.

In the present embodiment, the input to the compensator 632 is split in to high frequency and low frequency component. Specifically as shown in FIG. 6, the input to the lead-lag filter 633 is always connected to the push-pull signal. This is done because the high frequency components are not greatly affected by the offset. The low frequency component is connected to a switch comparator 651, which either selects the push-pull signal or the DPD signal based on the detection of the data by the data detector 649. Low frequency components of the push-pull signal can be the components that are affected by the offset. Accordingly, the radial controller 650 is used to overcome incorrect data detection by the data detector, by switching only the low frequency components that are input to the integrator 635.

Figure 7:
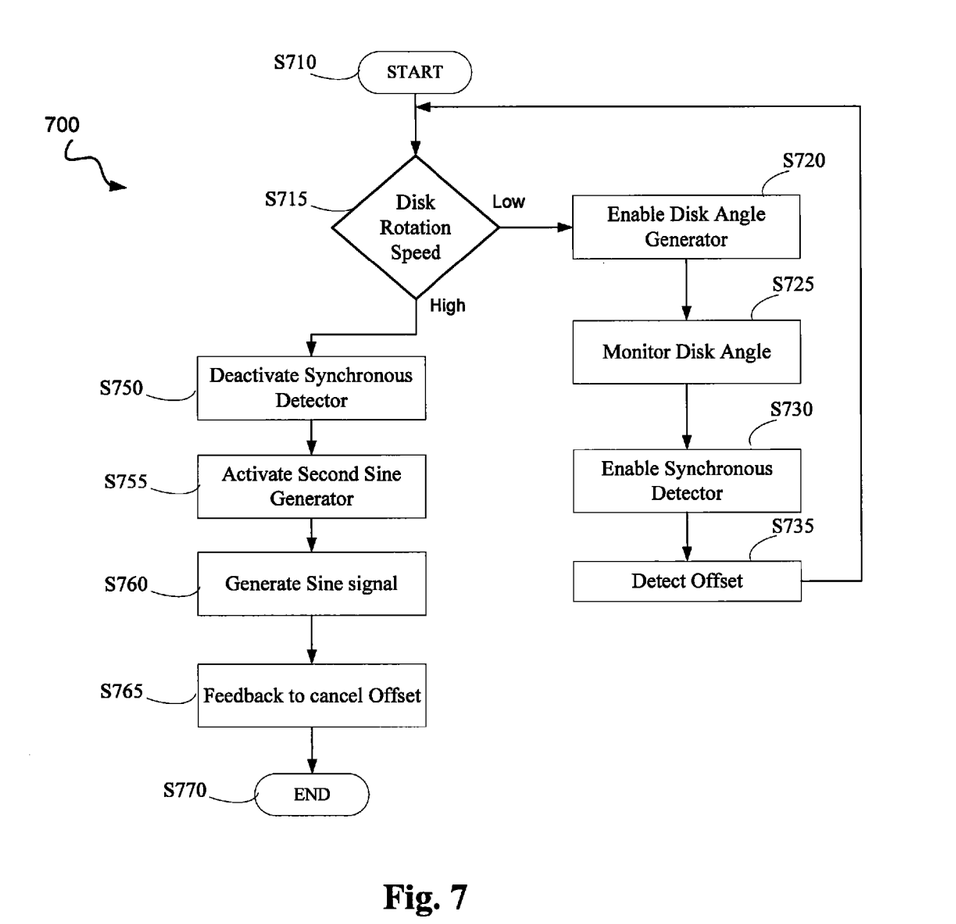
FIG. 7 shows a flowchart outlining an exemplary radial error correction process.

FIG. 7 shows a flowchart outlining an exemplary process 700 for correcting a radial error. The process starts at S710 and proceeds to S715, where a query is made by the controller to check the rotational speed of the optical disk. If the response to the query is a low rotational speed of the optical disk, the process proceeds to S720.

At S720, a disk angle generator (first sine generator) is activated by the controller. At S725, the sine generator monitors a disk angle of the optical disk and generates sine and cosine parameters of the rotational speed of the disk. These parameters are input to a synchronous detector which is activated at S730. At S735, the synchronous detector detects the offset signal of the single beam push-pull signal, and upon detection the process returns to S715.

If the response to the query at S715, is a high rotational speed of the optical disk, the process moves to S750, where the synchronous detector is deactivated and a second sine generator is activated at S755.

At S760, a sine signal having an amplitude that is generally equal in magnitude to an estimated offset (based on the detected offset signal at S730) and a phase that is proportional to a rotational speed of the disk is generated in order to add the offset to the push-pull signal. In doing so, offset error correction can be achieved at high disk rotational speeds.

The process then proceeds to S765, where the controller generates a feedback signal based on the sine wave to drive the radial actuator to reduce the offset error in the position of the objective lens. The process then ends at S770.

Figure 8:
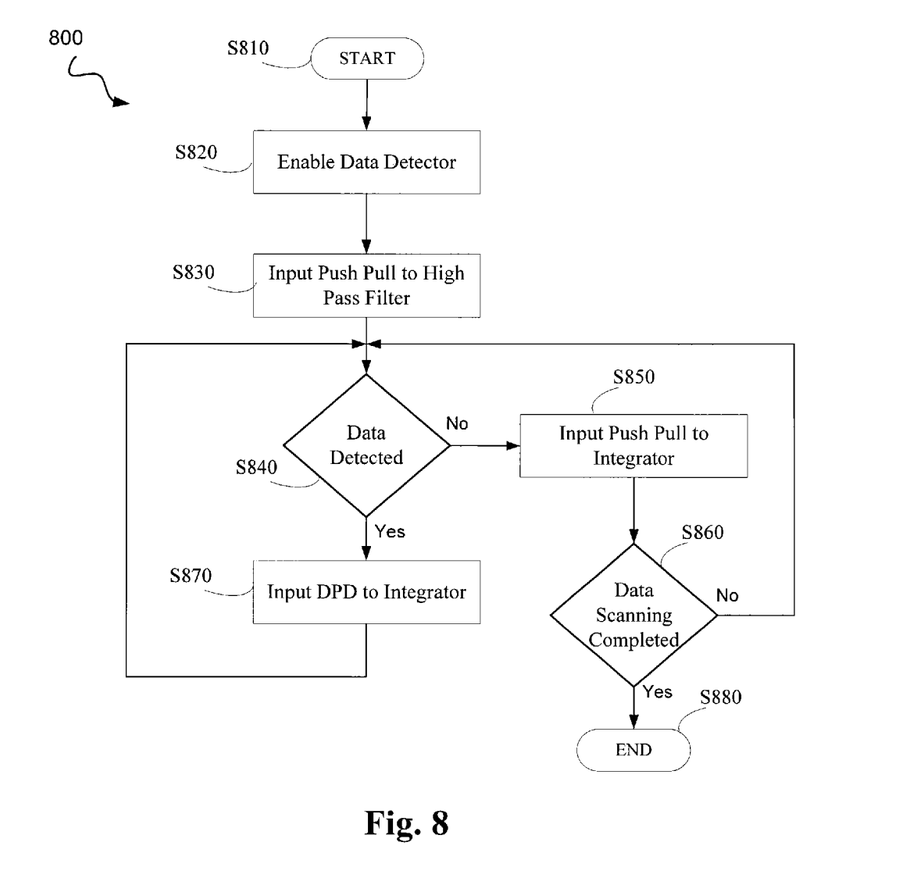
FIG. 8 shows a flowchart outlining an exemplary radial tracking process while performing the radial error correction of FIG. 7.

FIG. 8 shows a flowchart outlining an exemplary radial tracking process 800, while performing the radial error correction process of FIG. 7. Specifically, FIG. 8 depicts how a data detector is utilized to change the radial tracking process according to one aspect of the disclosure.

The process starts at S810 and proceeds to S820, where the data detector is enabled. For example, as shown in FIGS. 5 and 6, on detecting data (RF signal) the data detectors 549 and 649 are activated respectively. At S830, the push pull signal is input to the lead-lag filter of the compensator. For example, as shown in FIG. 6 the push-pull signal is input to the lead-lag filter 633. Note that high frequency components of the push-pull signal are less affected (if at all) by the radial offset.

At S840, a query is made to check if the data detector has detected the information (data) on a data spire (track) of the optical disk.

If the response to the query is affirmative, the process moves to S870. At S870, the differential phase detection (DPD) signal obtained from the photo-detector is input to the integrator unit of the compensator. Thus, the data is tracked via the DPD signal. For example, in the embodiment shown in FIG. 6, the DPD signal activates the switch comparator 651, and is input to the integrator 635. Thereafter, the process simply loops back to S840 to continue detecting the presence of data on the data spire.

If the response to the query at S840 is negative, the process moves to S850, where the push pull signal is input to the integrator unit of the compensator. This enables disk tracking by using the single beam push pull signal. For example, as shown in FIG. 6, if no data is detected on the data spire, the PP signal activates the switch comparator 651 and is input to the integrator 635. Note that the DPD signal is unable to track the optical disk in non-written areas.

The process further proceeds to S860 and another query is made to check if the data scanning operation is complete. If the response to the query is negative, the process loops back to S840 and continues tracking for data. If the response to the query of step S860 is affirmative, the process moves to S880 and completes execution. With the help of process outlined in the flowchart of FIG. 8, the non-written (empty) areas of the optical disk continue to be tracked by the single beam push pull signal and the written areas of the disk are tracked by the DPD signal.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus for reducing an offset error in a position of an objective lens of an optical disk reader, the apparatus comprising:
   a radial actuator configured to control the position of the objective lens; and
   a controller that is configured to
      receive a push-pull signal that corresponds to the offset error of the objective lens,
      estimate an offset of the objective lens based on the push-pull signal,
      generate a sine wave based on the estimated offset, the sine wave having an amplitude that is generally equal in magnitude to the estimated offset and a phase that is proportional to a rotational speed of the disk,
      drive the radial actuator based on the sine wave to reduce the offset error in the position of the objective lens, and
      operate in a first mode when the rotational speed of the disk is low, and a second mode when the rotational speed of the disk is high.

2. The apparatus of claim 1, wherein when the controller operates in the first mode, a first portion of the controller that includes a compensator, having a lead-lag filter and an integrator that receive the push-pull signal, calibrates an offset ratio based on a radial actuator drive signal and an offset error in the position of the objective lens.

3. The apparatus of claim 2, the first portion further including a first sine generator that is configured to generate a disk angle signal and provide the disk angle signal to a synchronous detector that is configured to detect an offset signal.

4. The apparatus of claim 1, wherein when the controller operates in the second mode, a second portion of the controller that includes a second sine generator, generates a sine wave based on an estimated offset, the sine wave having amplitude that is generally equal in magnitude to the estimated offset and phase that is proportional to the rotational speed of the disk.

5. The apparatus of claim 4, wherein the second portion further includes a switch that is configured to activate the second sine generator and deactivate a synchronous detector.

6. The apparatus of claim 1, further comprising a photodetector that is configured to generate a data signal, the push-pull signal, and a differential phase detection signal based on an optical signal received from the optical disk.

7. The apparatus of claim 1, further comprising a data detector that is configured to detect information on a data track of the optical disk and to change a data tracking mechanism from a push-pull mechanism to a differential phase detection (DPD) mechanism upon detecting information in the data track of the disk.

8. The apparatus of claim 7, further including a switch comparator that is configured to select one of a differential phase detection (DPD) signal and the push-pull signal as an input to a compensator based on the detected information on the data track of the disk.

9. The apparatus of claim 8, wherein the switch comparator is further configured to:
   provide the push-pull signal as input to a lead-lag filter of the compensator; and
   select one of the DPD signal and the push-pull signal as input to an integrator of the compensator based on the information on the data track of the disk.

10. A method for reducing an offset error in a position of an objective lens of an optical disk reader, the method comprising:
    receiving a push-pull signal that corresponds to the offset error of the objective lens;
    estimating an offset of the objective lens based on the push-pull signal;
    generating a sine wave based on the estimated offset of the objective lens, the sine wave having an amplitude that is generally equal in magnitude to the estimated offset and a phase that is proportional to a rotational speed of the optical disk;
    driving a radial actuator based on the generated sine wave to adjust the position of the objective lens; and
    determining whether to operate in a first mode or a second mode, based on the rotational speed of the optical disk.

11. The method of claim 10, when operating in the first mode, further comprising:
    calibrating an offset ratio based on a radial actuator drive signal and the offset error in the position of the objective lens;
    generating a disk angle signal based on the rotational speed of the optical disk; and
    providing the disk angle signal to a synchronous detector thus enabling the synchronous detector to detect an offset signal.

12. The method of claim 11, when operating in the second mode, further comprising:
    generating the sine wave based on the estimated offset, the sine wave having the amplitude that is generally equal in magnitude to the estimated offset and the phase that is proportional to the rotational speed of the disk.

13. The method of claim 10, further comprising:
    detecting information on a data track of the optical disk; and
    changing a data tracking mechanism from a push-pull mechanism to a differential phase detection (DPD) mechanism based on the information on the data track.

14. The method of claim 10, further comprising:
    detecting an optical signal received from the optical disk; and
    generating a data signal, the push-pull signal, and a differential phase detection signal from the detected optical signal.

15. The method of claim 13, further comprising:
    selecting one of the push-pull signal and a differential phase detection (DPD) signal as an input to a compensator based on information on the data track.

16. The method of claim 15, further comprising:
providing the push-pull signal as input to a lead lag filter of the compensator; and
selecting one of the DPD signal and the push-pull signal as input to an integrator of the compensator based on information on the data track of the disk.

* * * * *